(12) United States Patent
Lee et al.

(10) Patent No.: US 11,764,433 B2
(45) Date of Patent: Sep. 19, 2023

(54) BATTERY MODULE AND BATTERY MODULE ASSEMBLY

(71) Applicant: LG Chem, Ltd., Seoul (KR)

(72) Inventors: Youngho Lee, Daejeon (KR); Jonghwa Choi, Daejeon (KR); Youngsun Yun, Daejeon (KR); Soo Youl Kim, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/609,920

(22) PCT Filed: Jan. 17, 2019

(86) PCT No.: PCT/KR2019/000717
§ 371 (c)(1),
(2) Date: Oct. 31, 2019

(87) PCT Pub. No.: WO2019/146962
PCT Pub. Date: Aug. 1, 2019

(65) Prior Publication Data
US 2020/0203697 A1 Jun. 25, 2020

(30) Foreign Application Priority Data
Jan. 26, 2018 (KR) .................. 10-2018-0010011

(51) Int. Cl.
*H01M 50/258* (2021.01)
*H01M 50/204* (2021.01)
(Continued)

(52) U.S. Cl.
CPC ....... *H01M 50/258* (2021.01); *H01M 50/204* (2021.01); *H01M 50/296* (2021.01);
(Continued)

(58) Field of Classification Search
CPC .. H01M 50/502; H01M 50/20; H01M 50/258; H01M 50/543; H01M 2220/20;
(Continued)

(56) References Cited

U.S. PATENT DOCUMENTS

2006/0194101 A1* 8/2006 Ha ..................... H01M 6/46
429/158
2012/0015235 A1 1/2012 Fuhr et al.
(Continued)

FOREIGN PATENT DOCUMENTS

CN 102349176 A 2/2012
CN 102916153 A 2/2013
(Continued)

OTHER PUBLICATIONS

Search report from International Application No. PCT/KR2019/000717, dated May 9, 2019.
(Continued)

*Primary Examiner* — Christian Roldan
(74) *Attorney, Agent, or Firm* — Lerner David LLP

(57) ABSTRACT

An embodiment of the invention provides a battery module assembly, including: a first battery module including a first module case housing a plurality of battery cells, and a first input/output terminal and a second input/output terminal that are provided at one side of the first module case; and a second battery module including a second module case housing a plurality of battery cells, and a first input/output terminal and a second input/output terminal that are provided at one side of the second module case. The first input/output terminal of the first battery module may be formed by extending a first module bus bar connected to at least one of the plurality of battery cells inside the module (Continued)

case, and may extend to the second input/output terminal of the second battery module to be connected to the second input/output terminal.

5 Claims, 8 Drawing Sheets

(51) Int. Cl.
*H01M 50/296* (2021.01)
*H01M 50/50* (2021.01)
*H01M 50/552* (2021.01)
*H01M 50/517* (2021.01)
*H01M 50/503* (2021.01)

(52) U.S. Cl.
CPC ......... *H01M 50/50* (2021.01); *H01M 50/503* (2021.01); *H01M 50/517* (2021.01); *H01M 50/552* (2021.01); *H01M 2220/20* (2013.01)

(58) Field of Classification Search
CPC ........ H01M 50/50; Y02E 60/10; H01R 12/50; H01R 12/00
USPC .......................................................... 429/120
See application file for complete search history.

(56) References Cited

U.S. PATENT DOCUMENTS

| | | | |
|---|---|---|---|
| 2012/0288743 | A1 | 11/2012 | McLaughlin et al. |
| 2013/0017436 | A1 | 1/2013 | Kume |
| 2013/0136974 | A1 | 5/2013 | Lim et al. |
| 2013/0230761 | A1 | 9/2013 | Okutani et al. |
| 2014/0065467 | A1* | 3/2014 | Choi .................. H01M 50/211 174/68.2 |
| 2014/0120392 | A1* | 5/2014 | Ueno ..................... H01G 11/78 429/90 |
| 2015/0380713 | A1* | 12/2015 | Kimura .................. H01G 11/76 429/121 |
| 2017/0125774 | A1 | 5/2017 | Choi et al. |
| 2017/0214015 | A1 | 7/2017 | Maguire et al. |

FOREIGN PATENT DOCUMENTS

| | | | |
|---|---|---|---|
| CN | 104733681 A | | 6/2015 |
| IN | 201714017160 | | 12/2017 |
| JP | 2013020855 A | | 1/2013 |
| JP | 2013073929 A | | 4/2013 |
| JP | 2013115038 A | | 6/2013 |
| JP | 2014207084 A | | 10/2014 |
| JP | 2015141800 A | | 8/2015 |
| JP | 2016225065 A | | 12/2016 |
| KR | 20140036880 | * | 9/2012 |
| KR | 20140036880 A | | 3/2014 |
| KR | 20140039451 A | | 4/2014 |
| KR | 101524002 B1 | | 5/2015 |
| KR | 20150115402 A | | 10/2015 |
| KR | 20170026694 A | | 3/2017 |
| KR | 20170028647 A | | 3/2017 |
| KR | 101750487 B1 | | 7/2017 |
| WO | 2012073399 A1 | | 6/2012 |
| WO | 2014178114 A1 | | 11/2014 |

OTHER PUBLICATIONS

Extended European Search Report including Written Opinion for Application No. EP19744531.5, dated Apr. 3, 2020, pp. 1-7.
Search Report from Chinese Application No. 201980002218.1 dated Oct. 21, 2021. 3 pgs.

* cited by examiner

BATTERY MODULE AND BATTERY MODULE ASSEMBLY

CROSS-REFERENCE TO RELATED APPLICATION(S)

This application is a national phase entry under 35 U.S.C. § 371 of International Application No. PCT/KR2019/000717 filed Jan. 17, 2019, which claims priority from Korean Patent Application No. 10-2018-0010011 filed on Jan. 26, 2018, the entire contents of which are incorporated herein by reference.

TECHNICAL FIELD

The present invention relates to a battery module and a battery module assembly, and more particularly, to a battery module and a battery module assembly that may simplify electrical connection between battery modules in forming a battery module assembly by combining two or more battery modules.

BACKGROUND ART

With technology development and a demand for mobile devices, demand for secondary batteries as an energy source has been rapidly increasing. Accordingly, much research on batteries that may meet various demands has been conducted.

A secondary battery has attracted considerable attention as an energy source for power-driven devices, such as an electric bicycle, an electric vehicle, and a hybrid electric vehicle, as well as an energy source for mobile devices, such as a cellular phone, a digital camera, and a laptop computer.

A small-sized device such as a cellular phone, a camera, or the like uses a small-sized battery pack in which one battery cell is packed. However, a middle or large-sized device such as a laptop computer, an electric vehicle, or the like uses a middle or large-sized battery module assembly in which a plurality of battery modules including two or more battery cells connected to each other in parallel and/or in series are bound and combined.

The middle or large-sized battery module assembly includes a bus bar for electrical connection between the battery modules. Conventionally, a bus bar for connecting battery modules is manufactured as a separate part from a battery module. The bus bar is then assembled to the battery module by bolts formed in the battery module to which nuts are tightened. However, such an assembly process involving the bus bar increases process time in manufacturing the battery module assembly.

DISCLOSURE

Technical Problem

The present invention has been made in an effort provide a battery module and a battery module assembly that may improve workability and reduce a process time in manufacturing the battery module assembly.

Technical Solution

An exemplary embodiment of the present invention provides a battery module including: a module case housing a plurality of battery cells; and a first input/output terminal and a second input/output terminal that are provided at one side of the module case, wherein the first input/output terminal is formed by extending a first module bus bar connected to at least one of the plurality of battery cells inside the module case to a position away from the the module case.

An end portion of the first input/output terminal may be provided with a recess portion, and since the recess portion is formed at the same height as the second input/output terminal, when another battery module is disposed next to the battery module, the second input/output terminal of another battery module may be inserted into the recess portion of the first input/output terminal.

The battery module may further include a second module bus bar connected to at least one of the plurality of battery cells, wherein the second input/output terminal may be provided with a bolt including a body with a thread and a head connected to the body, the second module bus bar may be provided with a downwardly directed recess portion at an upper end thereof, and the body of the second input/output terminal may be inserted into the recess portion of the second module bus bar to be exposed to the outside.

The battery module may further include a second module bus bar connected to at least one of the plurality of battery cells, wherein the second input/output terminal may be provided with a nut formed with a terminal hole with a thread, the second module bus bar may be provided with a downwardly directed recess portion at an upper end thereof, and the terminal hole of the second input/output terminal may be disposed to be exposed to the outside through the recess portion of the second module bus bar, and a bolt fastened to the terminal hole may be further included.

The first input/output terminal may include a first portion extending in a vertical direction and a second portion bent in a direction perpendicular to the first portion and extending in a horizontal direction, and the recess portion may be recessed and formed in the horizontal direction at an end of the second portion.

Another embodiment of the invention provides a battery module assembly, including: a first battery module including a module case housing a plurality of battery cells, and a first input/output terminal and a second input/output terminal that are provided at one side of the module case; and a second battery module including a module case housing a plurality of battery cells, and a first input/output terminal and a second input/output terminal that are provided at one side of the module case, wherein the first input/output terminal of the first battery module may be formed by extending a first module bus bar connected to at least one of the plurality of battery cells inside the module case, and may extend to the second input/output terminal of the second battery module to be connected to the second input/output terminal.

The first input/output terminal of the first battery module may include a first portion extending in a vertical direction and a second portion bent in a direction perpendicular to the first portion and extending in a horizontal direction, and the second portion may include a recess portion that is recessed and formed in the horizontal direction from an end thereof.

The first battery module and the second battery module may further include a second module bus bar connected to at least one of the plurality of battery cells, respectively, the second input/output terminal of the first battery module and the second input/output terminal of the second battery module may be respectively provided with a bolt including a body with a thread and a head connected to the body, the second module bus bar may be provided with a downwardly directed recess portion at an upper end thereof, and the body of the second input/output terminal of the first battery module or of the second input/output terminal of the second battery module may be inserted into the recess portion of the second module bus bar to be exposed to the outside.

The body of the second input/output terminal of the second battery module may be inserted into the recess portion of the first input/output terminal of the first battery module, and a nut fastened to the body of the second input/output terminal of the second battery module may be further included.

The second battery module may further include a second module bus bar connected to at least one of the plurality of battery cells, and the second input/output terminal of the second battery module may be provided with a nut formed with a terminal hole with a thread, the second module bus bar may be provided with a downwardly directed recess portion at an upper end thereof, and the terminal hole of the second input/output terminal of of the second battery module may be disposed to be exposed to the outside through the recess portion of the second module bus bar.

The terminal hole of the second input/output terminal of the second battery module may be disposed in the recess portion of the first input/output terminal of the first battery module, and a nut fastened to the terminal hole of the second input/output terminal of the second battery module may be further included.

The second battery module may further include a third module bus bar connected to at least one of the plurality of battery cells, and the first input/output terminal of the second battery module may be provided with a bolt including a body with a thread and a head connected to the body, the third module bus bar may be provided with a downwardly directed recess portion at an upper end thereof, and the body of the first input/output terminal of the second battery module may be inserted into the recess portion of the third module bus bar to be exposed to the outside.

The battery module assembly may include two or more first battery modules. In this case, the first battery modules may be disposed so as to be adjacent to each other in a sequential manner, and the second battery module may be disposed adjacent to the outermost one of the first battery modules.

A device according to an embodiment of the present invention may include the battery module assembly described above.

Advantageous Effects

According to the battery module of the embodiment of the present invention, a battery module itself is provided with a bus bar that may be connected to a neighboring battery module, thereby simply connecting the battery modules and reducing the number of parts and time required for assembling.

MODE FOR INVENTION

Figure 1:
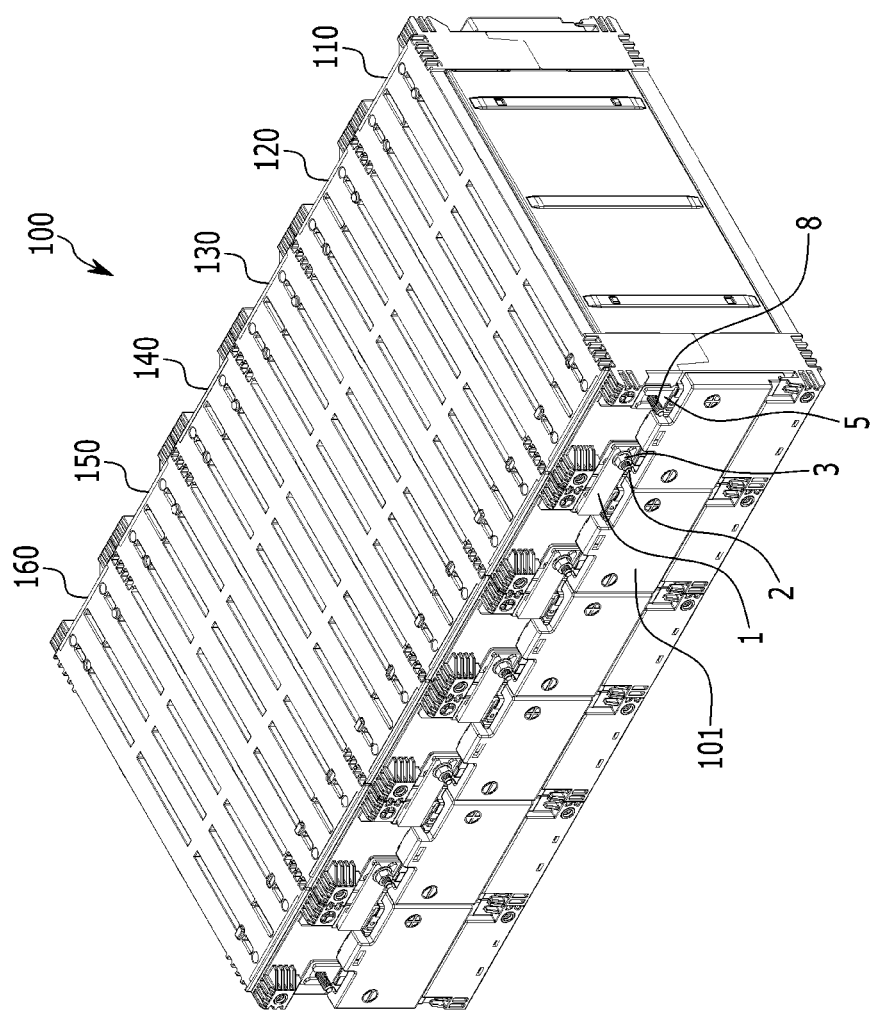
FIG. 1 illustrates a perspective view of a battery module assembly according to an embodiment of the present invention.

The present invention will be described more fully hereinafter with reference to the accompanying drawings, in which an exemplary embodiment of the invention is shown. As those skilled in the art would realize, the described embodiment may be modified in various different ways, all without departing from the spirit or scope of the present invention.

In the drawings, the thicknesses of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
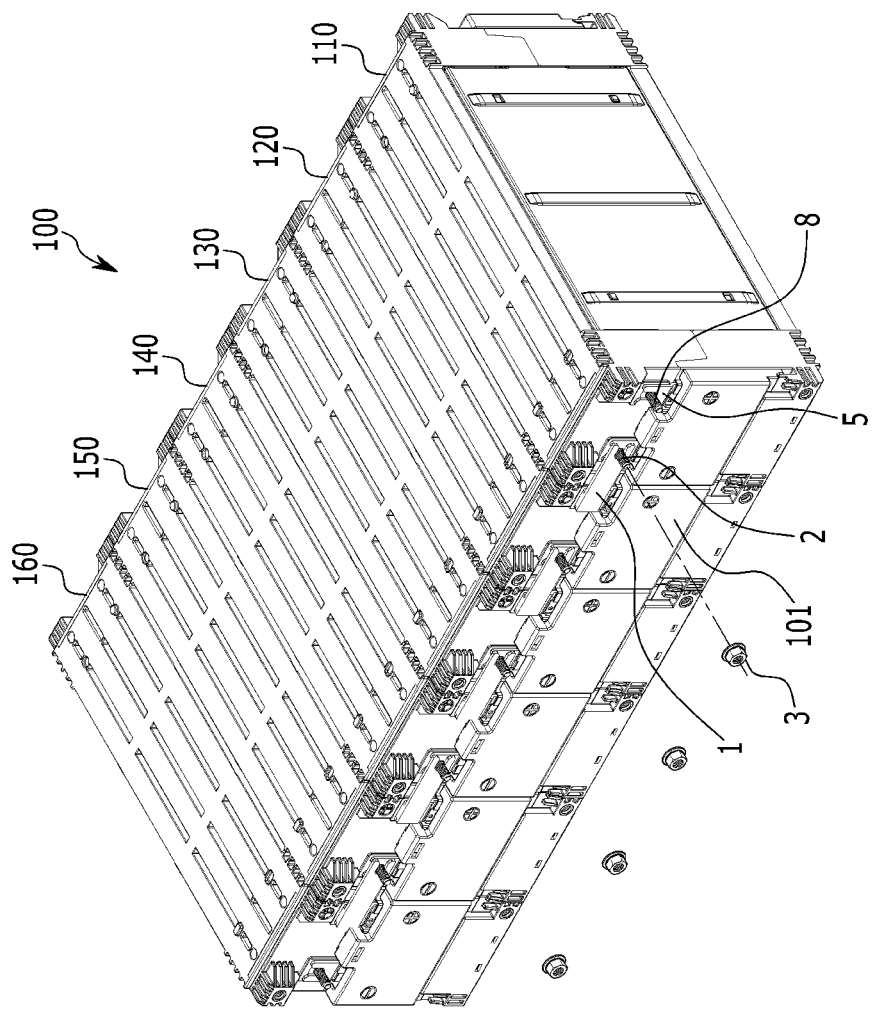
FIG. 2 illustrates a perspective view of a battery module assembly at a final stage of assembling the battery module assembly of FIG. 1.
Figure 3:
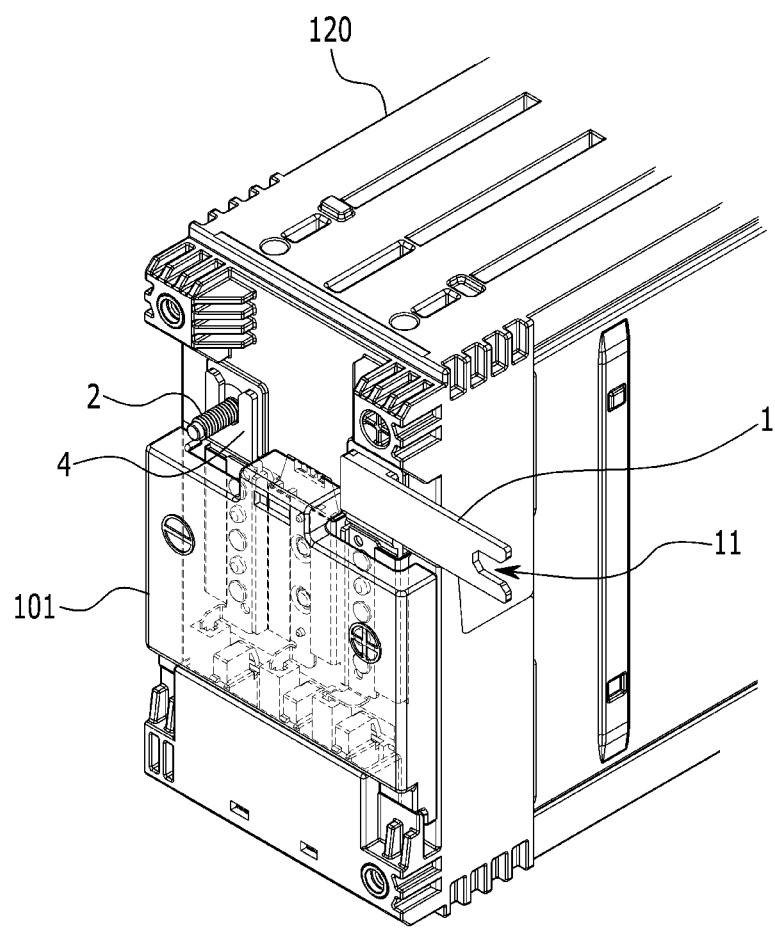
FIG. 3 illustrates an enlarged perspective view of one battery module included in the battery module assembly of FIG. 1.
Figure 4:
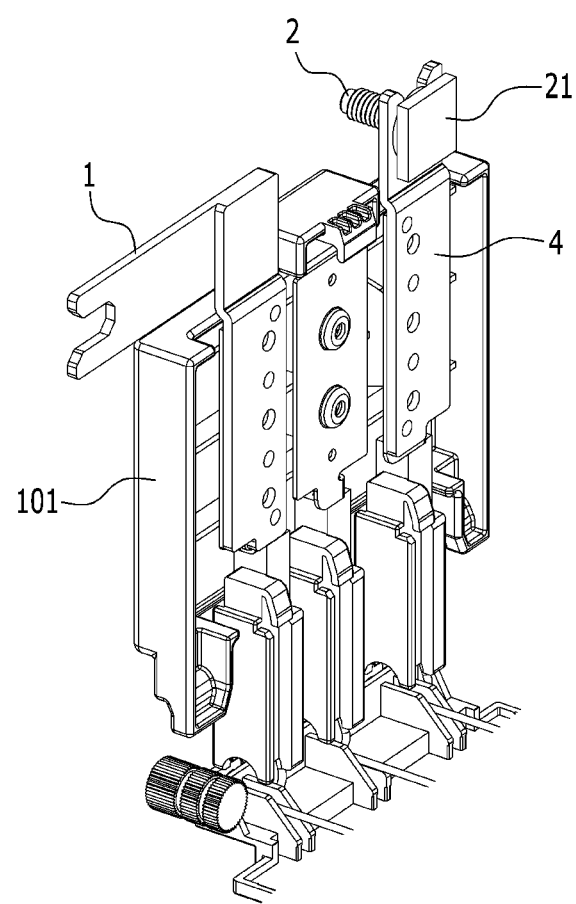
FIG. 4 illustrates an exploded perspective view of an arrangement structure of a left cover and a module bus bar of the battery module of FIG. 3.

FIG. 1 illustrates a perspective view of a battery module assembly according to an embodiment of the present invention, FIG. 2 illustrates a perspective view of a battery module assembly at a final stage of assembling the battery module assembly of FIG. 1, FIG. 3 illustrates an enlarged perspective view of one battery module included in the battery module assembly of FIG. 1, and FIG. 4 illustrates an exploded perspective view of an arrangement structure of a left cover and a module bus bar of the battery module of FIG. 3.

Referring to FIG. 1 to FIG. 4, a battery module assembly 100 according to an embodiment of the present invention includes six battery modules 110, 120, 130, 140, 150, and 160 closely attached to each other. Here, the number of the battery modules 110, 120, 130, 140, 150, and 160 may be adjusted as needed. Each of the battery modules 110, 120, 130, 140, 150, and 160 includes a plurality of battery cells (not shown), and the plurality of battery cells are closely disposed in a predetermined arrangement, and are interconnected in series or in parallel and housed in a module case.

An input/output terminal of any one of the battery cells is drawn out of the battery module through a module bus bar of the battery module 110, 120, 130, 140, 150, or 160 to be connected to neighboring battery modules or to be used as an input/output terminal of the battery module assembly 100. Each of the battery modules 110, 120, 130, 140, 150, and 160 includes a first input/output terminal and a second input/output terminal provided at one side of the module case, and in one embodiment of the present invention, the first input/output terminal is configured as an extended module bus bar 1.

The remaining battery modules 120, 130, 140, 150, and 160 of the battery modules 110, 120, 130, 140, 150, and 160 excluding the first battery module 110 have extended module bus bars 1 for connecting rightward neighboring battery modules. The expanded module bus bar 1 is a module bus bar connected to the terminal of the battery cell in each of the battery modules 120, 130, 140, 150, and 160 and extends in a vertical direction, is perpendicularly bent, and then extends in a horizontal direction, and it serves as the first input/output terminal and is extended to reach a second input/output terminal 2 of the rightward neighboring battery module. A recess portion 11 is formed at an end portion of the extended module bus bar 1, and thus, the second input/output terminal 2 of the battery module adjacent to the recess portion 11 is inserted into the recess portion 11.

The second input/output terminal 2 is provided at a left side of the battery module 110, 120, 130, 140, 150, or 160. The second input/output terminal 2 is provided with a body having a thread and a bolt having a quadrangular head 21. As shown in FIG. 4, the second input/output terminal 2 is connected to a module bus bar 4. An upper end of the module bus bar 4 is recessed downward in a U-shape, and the body of the second input/output terminal 2 is inserted into the recessed upper end. The quadrangular head 21 is pressed by the module bus bar 4, so that the second input/output terminal 2 is fixed. Lower portions of the extended module bus bar 1 and the module bus bar 4 are covered with and fixed to a side cover 101.

A nut 3 is fastened to the second input/output terminal 2 in a state in which the recess portion 11 of the extended module bus bar 1 is inserted into the second input/output terminal 2 of the neighboring battery module, so that the extended module bus bar 1 and the second input/output terminal 2 may be stably coupled.

Since the first battery module 110 is disposed at a rightmost side of the battery module assembly 100, there is no battery module to be electrically connected thereto. A first input/output terminal 8 of the first battery module 110 is provided with a body having a thread and a bolt having a quadrangular head, like the second input/output terminal 2. The first input/output terminal 8 of the first battery module 110 is connected to a module bus bar 5 connected to the inside of the battery module. The first input/output terminal 8 of the first battery module 110 is used as an input/output terminal of the battery module assembly 100.

By using the battery module having such a structure, the extended module bus bar 1 is inserted into the second input/output terminal 2 of the neighboring battery module and fixed by using the nut 3 without using a separate bus bar, so that the battery modules 110, 120, 130, 140 140, 150, and 160 may be simply electrically connected. Therefore, it is possible to reduce the number of parts, and since the number of processes required for assembly may be reduced, it is possible to reduce the process time.

Figure 5:
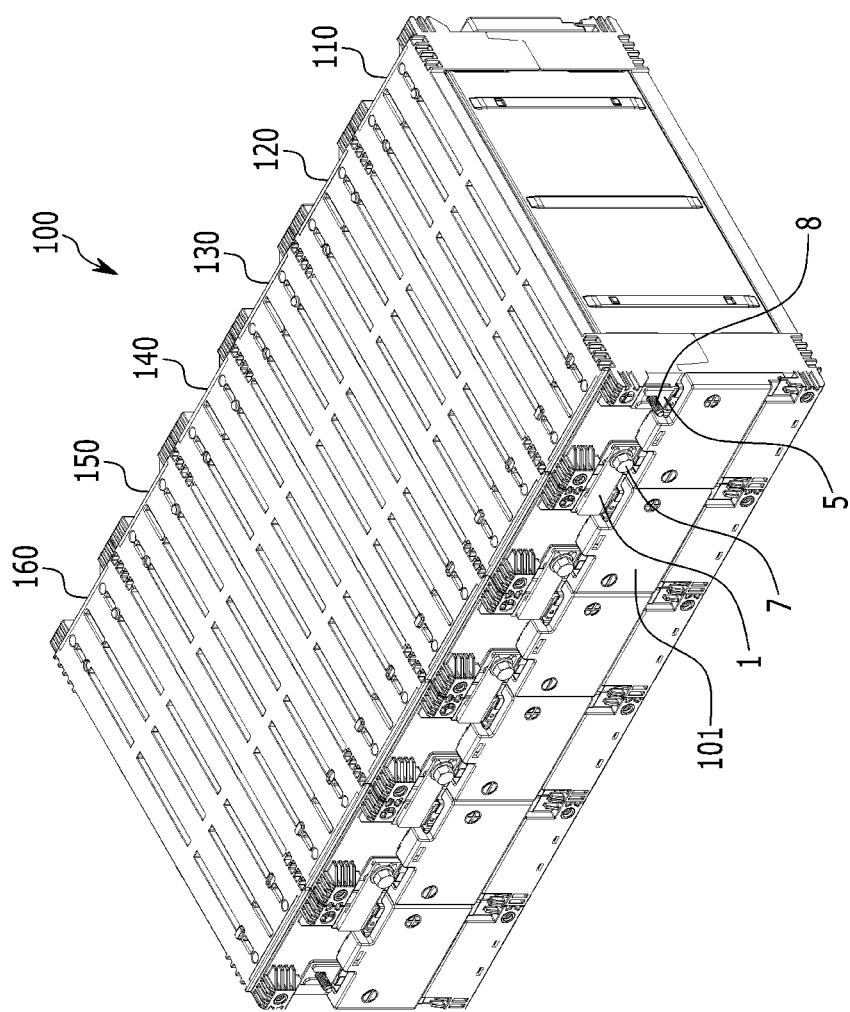
FIG. 5 illustrates a perspective view of a battery module assembly according to another embodiment of the present invention.
Figure 6:
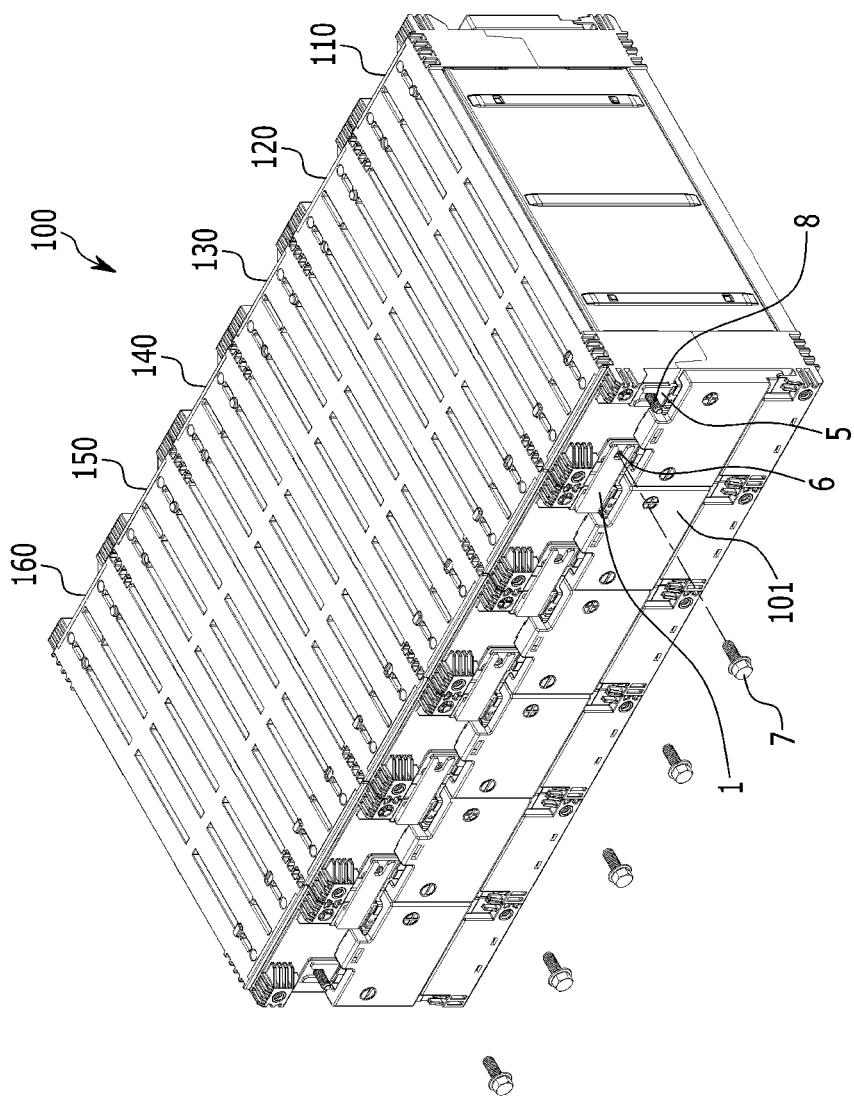
FIG. 6 illustrates a perspective view of a battery module assembly at a final stage of assembling the battery module assembly of FIG. 5.
Figure 7:
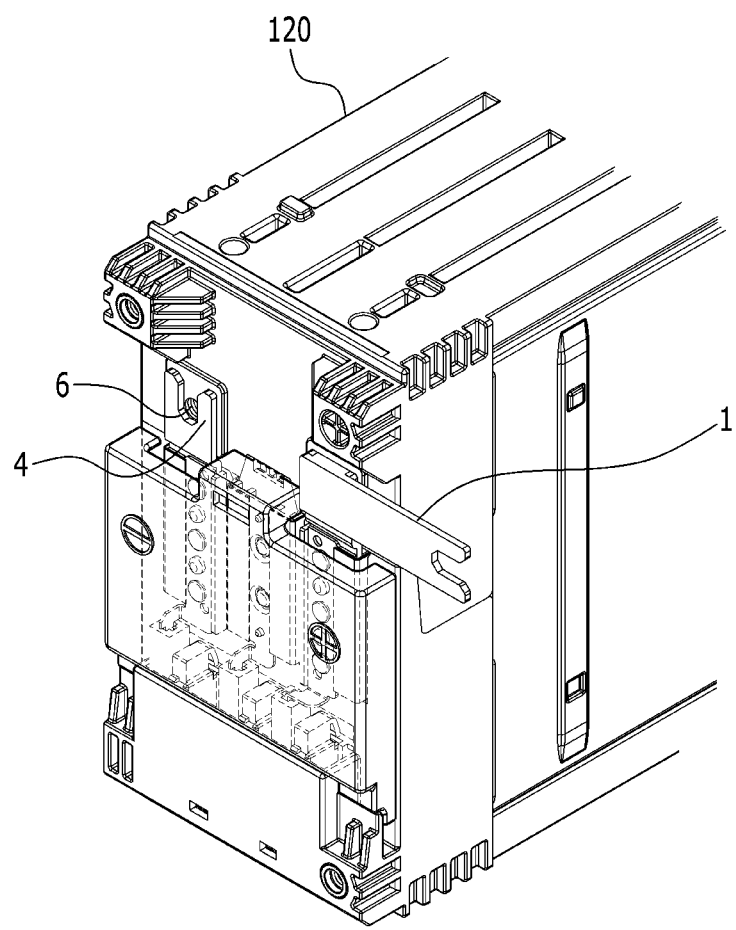
FIG. 7 illustrates an enlarged perspective view of one battery module included in the battery module assembly of FIG. 5.
Figure 8:
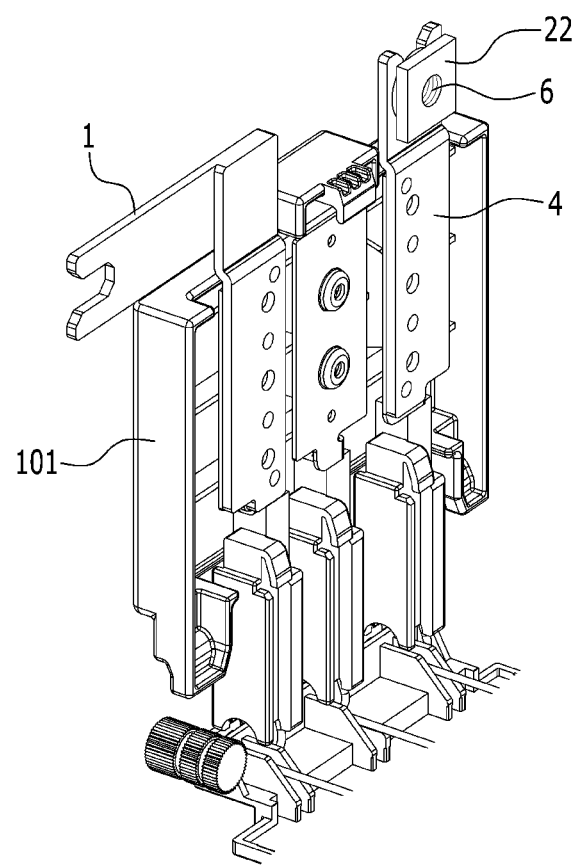
FIG. 8 illustrates an exploded perspective view of an arrangement structure of a left cover and a module bus bar of the battery module of FIG. 7.

FIG. 5 illustrates a perspective view of a battery module assembly according to another embodiment of the present invention, FIG. 6 illustrates a perspective view of a battery module assembly at a final stage of assembling the battery module assembly of FIG. 5, FIG. 7 illustrates an enlarged perspective view of one battery module included in the battery module assembly of FIG. 5, and FIG. 8 illustrates an exploded perspective view of an arrangement structure of a left cover and a module bus bar of the battery module of FIG. 7.

The above-described embodiment has the structure in which the second input/output terminal 2 is provided with the bolt on which the nut is fastened to fix the extended module bus bar 1, while the present embodiment, as shown in FIG. 5 to FIG. 8, has a structure in which a terminal nut 22 with a terminal hole 6 is installed inside the battery module and a bolt 7 is fastened to the terminal hole 6 to fix the extended module bus bar 1 such that the second input/output terminal is configured. As shown in FIG. 8, the terminal nut 22 is disposed inside the module bus bar 4 so that the terminal hole 6 is formed at a position corresponding to the recess portion of the extended module bus bar 1, and the bolt 7 is fastened to the terminal hole 6, so that the second input/output terminal is configured.

By using the battery module having such a structure, the recess portion of the extended module bus bar 1 is positioned adjacent to the terminal hole 6 of the neighboring battery module and the bolt 7 is fastened and fixed to the terminal hole 6, so that the battery modules 110, 120, 130, 140 140, 150, and 160 may be simply electrically connected. Therefore, it is possible to reduce the number of parts, and since the number of processes required for assembly may be reduced, it is possible to reduce the process time.

The battery module assembly described above may be applied to various devices. It may be applied to a transportation apparatus such as an electric bicycle, an electric vehicle, a hybrid vehicle, and the like, but is not limited thereto, and may be applied to various devices that can use the battery module assembly.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| 1: | extended module bus bar | 11: | recess portion |
| 2: | second input/output terminal | 8: | first input/output terminal |
| 5: | second module bus bar | 3: | nut |
| 6: | terminal hole | 7: | bolt |
| 110, 120, 130, 140, 150, 160: | battery module | | |
| 100: | battery module assembly | | |

The invention claimed is:
1. A battery module comprising:
a module case having an interior housing a plurality of battery cells therein, the module case having an outermost periphery in a horizontal direction, the horizontal direction being perpendicular to a vertical direction; and
a first input/output terminal and a second input/output terminal positioned at a front side of the module case, the front side being parallel to the horizontal direction and the vertical direction,
wherein the first input/output terminal comprises a first module bus bar extending from within the interior of the module case to an exterior of the module case, the first module bus bar comprising a first elongated portion and a second elongated portion integrally connected together at a connecting region such that the first elongated portion and the second elongated portion project outward from the connecting region along respective first and second linear axes that are perpendicular to one another and parallel to the front side, the first elongated portion extending along the vertical direction within the interior of the module case such that the first elongated portion is connected to at least one of the plurality of battery cells in the interior of the module case, and the second elongated portion extending from the connecting region along the horizontal direction to a terminal end opposed to the connecting region and positioned exteriorly to the module case, the terminal end being spaced away from the module case such that the terminal end is located beyond the outermost periphery in the horizontal direction, the terminal end comprising a recess portion defined therein, the recess portion being spaced from a base of the module case by the same distance in the vertical direction as the second input/output terminal, such that, when a second battery module is disposed next to the battery module in the horizontal direction, a second input/output terminal of the second battery module can be received in the recess portion.

2. The battery module of claim 1, further comprising
a second module bus bar connected to at least one of the plurality of battery cells, the second module bus bar comprising an upper end having a downwardly directed recess portion therein, wherein the second input/output terminal of the battery module includes a bolt, the bolt comprising a threaded body and a head connected to the threaded body, the threaded body being positioned in the downwardly directed recess portion of the second module bus bar such that the threaded body is exposed outside of the battery module.

3. The battery module of claim 1, further comprising
a second module bus bar connected to at least one of the plurality of battery cells, the second module bus bar including an upper end having a downwardly directed recess portion, wherein the second input/output terminal of the battery module includes a nut having a threaded terminal hole, the terminal hole being aligned with the recess portion of the second module bus bar so as to be exposed to the outside of the battery module.

4. The battery module of claim 3, further comprising
a bolt fastened to the terminal hole.

5. The battery module of claim 1, wherein
the recess portion is oriented in the horizontal direction at the terminal end of the second elongated portion.

* * * * *